United States Patent [19]

Holehouse

[11] 4,174,375

[45] Nov. 13, 1979

[54] PROCESS FOR REMOVING FLUORINE COMPOUNDS AND SULFUR DIOXIDE FROM EXHAUST GASES

[75] Inventor: Stephen L. Holehouse, Frankfurt am Main, Fed. Rep. of Germany

[73] Assignee: Metallgesellschaft Aktiengesellschaft, Frankfurt am Main, Fed. Rep. of Germany

[21] Appl. No.: 924,716

[22] Filed: Jul. 14, 1978

[30] Foreign Application Priority Data

Aug. 6, 1977 [DE] Fed. Rep. of Germany ....... 2735566

[51] Int. Cl.² .......................................... B01D 53/34
[52] U.S. Cl. ..................................... 423/240; 423/242
[58] Field of Search ................... 423/240, 241, 242 A, 423/481, 555, 490

[56] References Cited

U.S. PATENT DOCUMENTS

| | | |
|---|---|---|
| 3,709,978 | 1/1973 | Predikant .......................... 423/240 R |
| 3,919,392 | 11/1975 | Teller ................................ 423/240 R |

*Primary Examiner*—Earl C. Thomas
*Attorney, Agent, or Firm*—Karl F. Ross

[57] ABSTRACT

Exhaust gas, e.g. from a metallurgical process, containing $SO_2$ and HF is acid scrubbed to remove most of the F compounds and is then base scrubbed to remove most of the $SO_2$ and remaining compounds. The recycled acid absorbent is mixed with part of the recovered basic absorbent. Another part of the basic absorbent is regenerated by the addition of $Ca(OH)_2$ and the regenerated basic absorbent is softened with F-containing absorbent from the acid-scrubbing stage.

8 Claims, 1 Drawing Figure

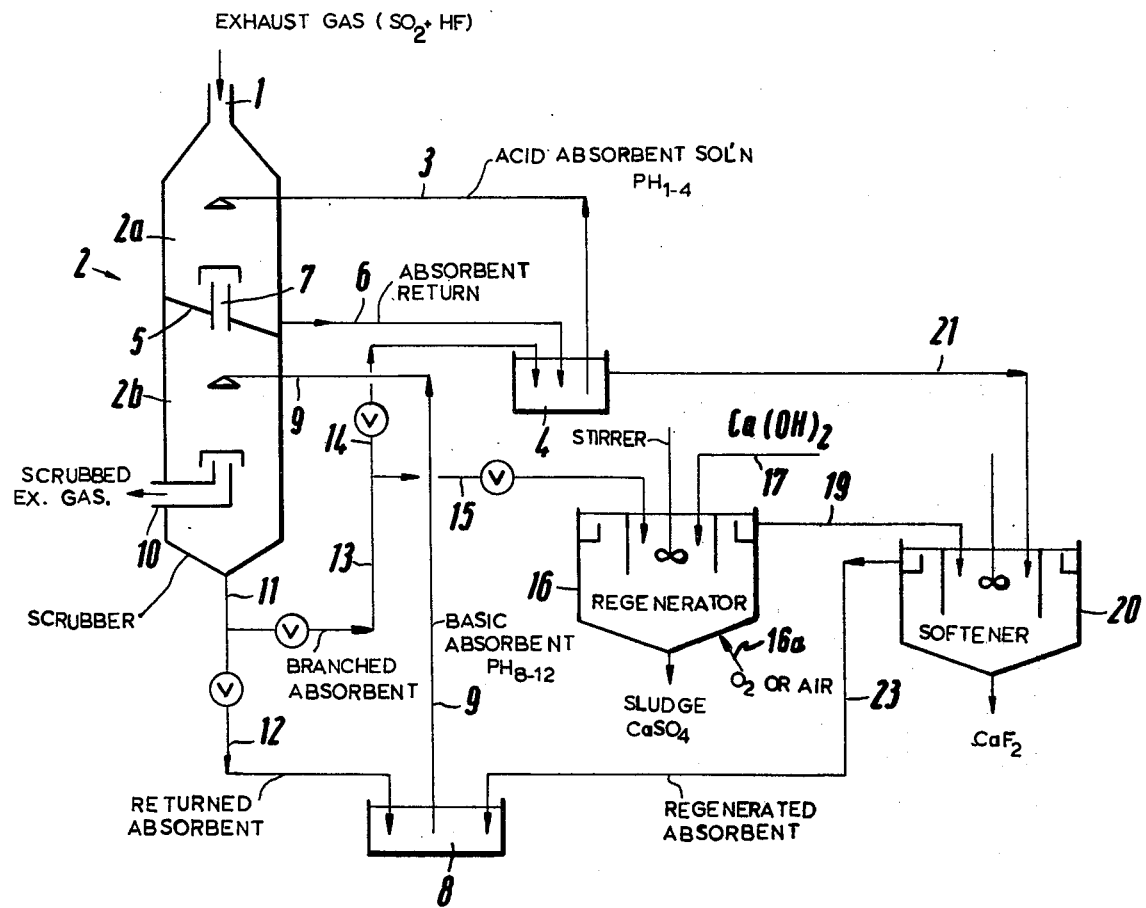

PROCESS FOR REMOVING FLUORINE COMPOUNDS AND SULFUR DIOXIDE FROM EXHAUST GASES

FIELD OF THE INVENTION

My present invention relates to a process for removing fluorine compounds and sulfur dioxide from exhaust gas by two-stage scrubbing.

BACKGROUND OF THE INVENTION

From Open German Specification (Offenlegungsschrift) DT-OS No. 2,304,496 and the corresponding U.S. Patent No. 3,914,387 it is known to remove $SO_2$ from exhaust gases by scrubbing with an absorbent solution which contains caustic soda (NaOH) and sodium sulfate. In that process, part of the used absorbent solution is continuously regenerated by the addition of calcium hydroxide with precipitation of calcium sulfate and is re-used.

While this technique has been found to be highly effective, it nevertheless has the drawback that, as described, it cannot also rid the exhaust gas, usually derived from combustion in an industrial furnace or power plant or from a chemical or metallurgical process plant, of fluorine compounds such as HF before the gas is recycled or discharged into the environment. Thus, if the exhaust gas contains substantial quantities of HF, special means must be adopted for its removal and such means are seldom economical.

OBJECTS OF THE INVENTION

It is an object of the present invention to provide an improved gas-cleaning process which removes $SO_2$ and fluorine compounds, mainly HF, from exhaust gases.

Another object is to provide a process whereby most of the fluorine compounds are removed from the exhaust gas separate from the $SO_2$ but in a manner which is technologically compatible with the removal of the $SO_2$.

Yet another object is to provide an improved economical process for the scrubbing of exhaust gases of the type described without the drawbacks of earlier systems.

SUMMARY OF THE INVENTION

I have discovered, most suprisingly that most of the $SO_2$ and HF of an exhaust gas can be removed to an environmentally satisfactory degree by a two-stage scrubbing process.

The exhaust gas is treated in a first scrubbing stage with acid absorbent solution having a pH value of at most 5, whereby a major part of the fluorine compounds are removed.

Part of the absorbent solution used in the first scrubbing stage is re-fed (recycled) to the first scrubbing stage.

The exhaust gas treated in the first scrubbing stage is treated in a second scrubbing stage with a basic absorbent solution having a pH-value of at least 8 to remove $SO_2$ and residual fluorine compounds and to produce a highly water-soluble sulfite and/or sulfate.

Part of the absorbent solution used in the second scrubbing stage is regenerated by the addition of calcium hydroxide, the regenerated scrubbing solution being softened by being mixed with absorbent solution which contains fluorine compounds, whereby calcium fluoride is precipitated.

Absorbent solution which has been regenerated and softened is used in the second scrubbing stage.

This process is thus distinguished in that absorbent solutions having different pH-values are used in the several scrubbing stages and the fluorine compounds which have been scrubbed out are used to soften part of the absorbent solution.

The softening keeps the concentration of calcium ions in the absorbent solution low so that any significant deposition of calcium compounds on the walls of the scrubbing stages and in the conduits is avoided.

Part of the absorbent solution which has been used in and withdrawn from the second scrubbing stage is desirably re-used in the first scrubbing stage, i.e. is recycled thereto. This re-used absorbent solution replaces the fluorine-containing absorbent solution which has been withdrawn from the first scrubbing stage and used for softening. An absorbent solution having a pH-value of 1 to 4 is preferably fed to the first scrubbing stage.

The pH-value of the absorbent solution fed to the second scrubbing stage is preferably in the range of 8 to 12.

Used absorbent solution having generally a pH-value of 5.5 to 7.5 is withdrawn from the second scrubbing stage and is mixed in part with absorbent solution which has been regenerated and softened and the resulting mixture is returned to the second scrubbing solution.

BRIEF DESCRIPTION OF THE DRAWING

The above and other objects, features and advantages will be more readily apparent from the following description, reference being made to the accompanying drawing, the sole FIGURE of which is a flow diagram illustrating the best mode known to me for carrying out the invention.

SPECIFIC DESCRIPTION

In the drawing, in which pumps, valves and like control, feed or recycling components have been omitted for the sake of clarity, the basic elements are a two-stage scrubbing tower 2, supply tanks 4 and 8, a regenerating vessel 16, and a softening tank 20.

Exhaust gas which is to be freed from $SO_2$ and fluorine compounds, particularly HF, is fed to the scrubbing tower 2 through an inlet 1. The scrubbing plant 2 comprises a first scrubbing stage 2a and a second scrubbing stage 2b. Each scrubbing stage may consist of a venturi scrubber or radial-flow scrubber, known per se. For instance, the scrubbing tower 2 may consist of a two-stage or multi-stage radial flow scrubber of the type described in German Pat. No. 2,224,519 and the corresponding U.S. Pat. No. 3,834,127. Details of the venturi scrubbers or radial-flow scrubbers are not shown in the drawing.

The first scrubbing stage 2a is mainly used to remove the fluorine compounds. For that purpose, an acid absorbent solution is fed to the scrubbing stage through conduit 3. The pH-value of said solution does not exceed 5 and lies preferably in the range from 1 to 4. The absorbent solution comes from a supply tank 4 and in addition to hydrogen ions may contain sodium ions, potassium ions or ammonium ions in a concentration of 3 to 15 grams per liter. Absorbent solution which has been used in the scrubbing stage 2a collects on the plate 5 of said scrubbing stage and is recycled through conduit 6 to the tank 4.

After the removal of most of its HF content in the first scrubbing stage 2a, the gas flows through the transfer pipe 7 to the second scrubbing stage 2b without entraining substantial quantities of absorbent solution. In the second scrubbing stage the gas is treated with basic absorbent solution which has in most cases a pH-value in the range from 8 to 12. This absorbent solution consists of an aqueous solution which contains sodium ions, potassium ions or ammonium ions.

The solution is fed from a second supply tank 8 through conduit 9. The concentration of sodium ions, potassium ions or ammonium ions is in the range from 3 to 15 grams per liter. By means of this absorbent solution, $SO_2$ and residual fluorine compounds are removed from the gas in the second stage 2b. The scrubbed gas leaves the scrubbing plant 2 through the pure-gas discharge conduit 10.

Absorbent solution used in the second stage 2b collects at the lower end of the column and is withdrawn through conduit 11. A first part of the used absorbent solution flows through the conduit 12 back to the tank 8. A partial stream of the used absorbent solution is branched off and is fed to the supply tank 4 through conduits 13 and 14. A third part of the used absorbent solution is fed through conduit 15 to a regenerating vessel 16 and is regenerated therein in that the used absorbent solution is mixed with milk of lime ($Ca(OH)_2$) from conduit 17 with stirring.

A high concentration of sulfate ions and a virtual absence of sulfite ions is often desired in the regenerating vessel 16. The oxidation of sulfite to sulfate can be promoted in that air or oxygen is fed into the absorbent solution in the vessel 16. This is represented at 16a. In contact with the calcium ions of the milk of lime, sulfate and sulfite are transformed to $CaSO_4$ and $CaSO_3$, respectively, which settle to the bottom of the vessel 16 as sludge and are withdrawn from there.

The absorbent solution which has been regenerated in the vessel 16 is saturated with calcium ions and is fed through conduit 19 to tank 20 to be softened therein. For this purpose, the absorbent solution is mixed in the tank 20 with absorbent solution which contains fluorine ions, with stirring. The absorbent solution which contains up to 40 grams of soluble fluorine compounds per liter is fed from the first sypply tank 4 through conduit 21. In the tank 20, most of the calcium ions combine with fluorine ions to form calcium fluorine ($CaF_2$) which settles to the bottom of the tank and is withdrawn from there.

Absorbent solution which has been regenerated and softened is recycled from the softening tank 20 through conduit 23 to the supply tank 8. The absorbent solution in conduit 23 has a calcium ion concentration of up to 10 millimoles per liter, preferably in the range from 1 to 9 millimoles per liter.

EXAMPLE

Exhaust gas which becomes available in an iron ore-pelletizing plant at a rate of 500,000 standard $m^3$/h and in addition to a substantial dust content contains 70 mg HF and 300 mg $SO_2$ per standard $m^3$.

The exhaust gas is subjected to wet scrubbing in the process shown in the drawing. An absorbent solution which has a pH-value of 1 is fed to the first scrubbing stage 2a at a rate of 1.5liter per standard $m^3$ of gas. The gas transferred to the second scrubbing stage 2b still contains 5 mg HF and 280 mg $SO_2$ per standard $m^3$.

An absorbent solution having a pH-value of 11 is fed through conduit 9 to the second scrubbing stage at a rate of 2 liters per standard $m^3$ of gas. The scrubbed gas which is discharged through conduit 10 has residual contents of 2 mg HF and 50 mg $SO_2$ per standard $m^3$.

Used absorbent solution having a pH-value of 6 is withdrawn from scrubbing stage 2b. At a rate of 910 $m^3$/h, a partial stream of said used absorbent is fed through conduit 12 to the second supply tank 8 and is subsequently re-used. The remaining used absorbent solution at a rate of 90 $m^3$/h is divided between conduits 14 and 15 at a ratio of 1:4. In the regenerating vessel 16, 2 kg $Ca(OH)_2$ are admixed per $m^3$ of absorbent solution. Air is also fed to the regenerating vessel. Precipitated gypsum ($CaSO_4$) is removed from the vessel 16 at a rate of 330 kg/h.

Absorbent solution is fed through conduit 15 to the vessel 16 and is withdrawn therefrom through conduit 19 at the same rate. The withdrawn absorbent solution is fed to the tank 20 and is softened therein by being mixed with absorbent solution which is fed through conduit 21 at a rate of 16 $m^3$/h and contains 2 grams of fluorine ions per liter. Precipitated $CaF_2$ is withdrawn. Absorbent solution which has been regenerated and softened and has a calcium ion concentration of 5 millimoles per liter is added to the second supply tank 8 through conduit 23 at a rate of 90 $m^3$/h.

I claim:
1. A process for removing hydrogen fluoride and sulfur dioxide from exhaust gas comprising the steps of:
   (a) scrubbing the exhaust gas in a first scrubbing stage with acid absorbent solution containing ions of sodium, potassium or ammonium and having a pH-value of at most 5 to remove a major part of the fluorine compounds;
   (b) recycling part of the absorbent solution used in step (a) to said first scrubbing stage;
   (c) scrubbing the exhaust gas scrubbed in the first scrubbing stage in a second scrubbing stage with a basic absorbent solution containing ions of sodium, potassium or ammonium and having a pH-value of at least 8 to remove $SO_2$ and residual hydrogen fluoride and produce a highly water-soluble sulfite and/or sulfate;
   (d) in a regeneration zone regenerating a first part of the absorbent solution used in the second scrubbing stage (c) by the addition of calcium hydroxide thereto, and withdrawing sludge from the regeneration zone;
   (e) softening regenerated scrubbing solution from step (d) by mixing it in a softening zone with absorbent solution used in and withdrawn from step (a) which contains fluoride ions to precipitate calcium fluoride, and recovering the calcium fluoride precipitated;
   (f) mixing softened absorbent solution which has been regenerated and softened in step (e) with a second part of the absorbent used in the second scrubbing stage (c) and feeding the resulting mixture as the basic absorbent solution to the second scrubbing stage; and
   (g) withdrawing a third part of the absorbent solution used in the second scrubbing stage (c) and feeding this third part to the first scrubbing stage (a) as part of the solution to be used therein.

2. The process defined in claim 1 wherein an absorbent solution having a pH-value of 1 to 4 is fed to the first scrubbing stage (a).

3. The process defined in claim 2 wherein an absorbent solution having a pH-value of 8 to 12 is fed to the second scrubbing stage (c).

4. The process defined in claim 3 wherein absorbent solution having a pH-value of 5.5 to 7.5 is withdrawn from the second scrubbing stage (c) and is mixed in part with absorbent solution which has been regenerated and softened and the resulting mixture being re-fed to the second scrubbing solution.

5. The process defined in claim 3 wherein the absorbent solution which has been regenerated and softened has a calcium ion concentration of 1 to 10 millimoles per liter.

6. The process defined in claim 3 wherein at least one of the two scrubbing stages comprises a venturi scrubber.

7. The process defined in claim 3 wherein at least one of the two scrubbing stages contains a radial-flow scrubber.

8. The process defined in claim 3 wherein the absorbent fed to the second scrubbing stage contains 3 to 15 grams of sodium ions, potassium ions, or ammonium ions per liter in an aqueous solution.

* * * * *